(12) United States Patent
Favish

(10) Patent No.: US 8,799,098 B2
(45) Date of Patent: Aug. 5, 2014

(54) CUSTOMIZED MARKETING

(75) Inventor: Craig Favish, San Diego, CA (US)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/475,477

(22) Filed: May 18, 2012

(65) Prior Publication Data

US 2013/0311332 A1    Nov. 21, 2013

Related U.S. Application Data

(60) Provisional application No. 61/561,209, filed on Nov. 17, 2011.

(51) Int. Cl.
*G06Q 30/00*    (2012.01)

(52) U.S. Cl.
USPC .......................................................... 705/26.1

(58) Field of Classification Search
USPC .......................................................... 705/26.1
See application file for complete search history.

(56) References Cited

U.S. PATENT DOCUMENTS

2010/0332603 A1 *  12/2010  Sun et al. ...................... 709/206
2013/0179305 A1 *  7/2013  Ashkenazi et al. ........ 705/26.63

* cited by examiner

*Primary Examiner* — Mila Airapetian
(74) *Attorney, Agent, or Firm* — Sony Corporation

(57) ABSTRACT

A computer implemented marketing method comprising: characterizing a customer in real-time based on a determination of whether one or more rules have been satisfied, and providing real-time customized assistance to the customer if a characterizing threshold is met.

19 Claims, 5 Drawing Sheets

CUSTOMIZED MARKETING

FIELD

The disclosure relates, in general, to a system and method for marketing. More specifically, the disclosure relates to a computer implemented customized marketing technique that provides personalized shopping experience to a customer.

BACKGROUND

Customers can purchase various products and services from a retail store or an online shopping website. The available products and services are often grouped into multiple categories based on their type, salient features, price, customer segments, etc. The information associated with the available products and services, such as features, design, price, etc., helps the customer decide on purchasing a product or subscribing to a service. However, not every visit to a retail store or an online shopping website results in a sale.

SUMMARY

Embodiments of the present disclosure generally include a computer implemented marketing method comprising: characterizing a customer in real-time based on a determination of whether one or more rules have been satisfied, and providing real-time customized assistance to the customer if a characterizing threshold is met.

Embodiments of the present disclosure generally include a computer implemented marketing system comprising: a characterizing engine configured to characterize a customer in real-time based on one or more rules being satisfied, where each rule of the one or more rules is satisfied when one or more parameters defining each of the rules meet respective thresholds; and an assistor configured to provide a real-time customized assistance to the customer based on the one or more rules being satisfied.

Further embodiments of the present disclosure generally include a computer implemented marketing method comprising: generating values for one or more parameters of a customer browsing a web page of an online store; characterizing the customer in real-time based on a determination of whether one or more rules have been satisfied, where each rule of the one or more rules is satisfied when a value of the one or more parameters defining each of the rules meet respective thresholds; and publishing a web page component on the web page based on the satisfied one or more rules, where a content of the web page component is customizable in real-time based on the satisfied one or more rules.

BRIEF DESCRIPTION OF DRAWINGS

The following detailed description of the various embodiments will be better understood when read with reference to the appended drawings. The embodiments are illustrated by way of examples, and are not limited by the accompanying figures, in which like references indicate similar elements.

DETAILED DESCRIPTION

Figure 1:
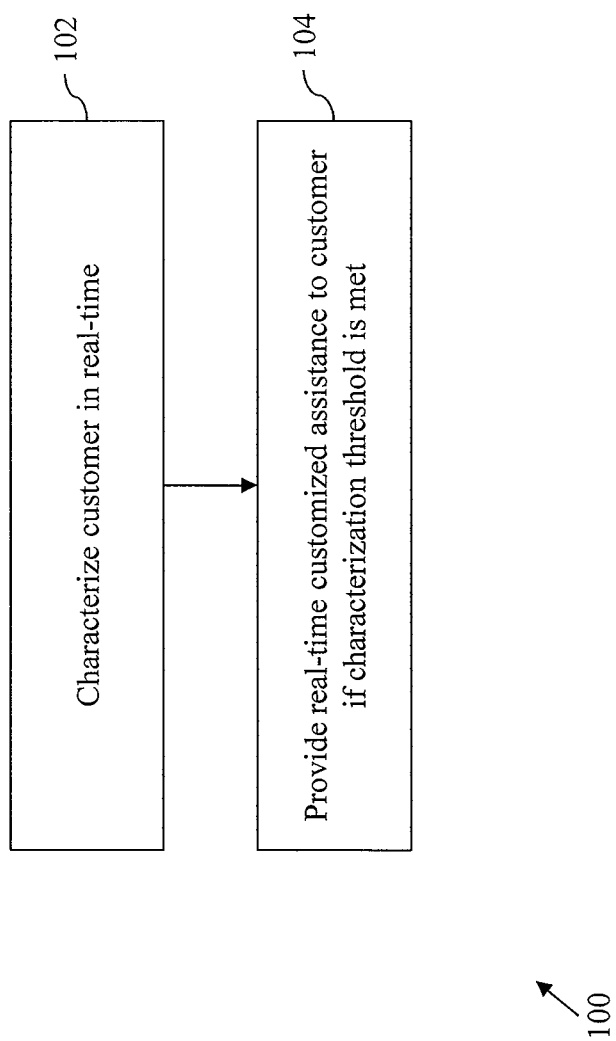
FIG. 1 is a flow diagram representing a computer implemented marketing method in accordance with an embodiment.

The disclosed embodiments can be best understood with reference to the figures and detailed description set forth herein. Various embodiments are discussed below with reference to the figures. However, those skilled in the art will readily appreciate that the detailed description given herein with respect to these figures is just for explanatory purposes as the disclosed methods and systems extend beyond the described embodiments.

DEFINITION OF TERMS

Product (or Service) Store: Product store corresponds to an aggregation of products available for sale to customers. For example, a product store may refer to an online shopping website offering products and/or services through the Internet or a retail store located in a city that offers products over the counter.

Customer: A customer is a person who visits the product store to browse and/or purchase a product and/or a service.

Customer activities: Customer activities correspond to one or more actions performed by the customer in the product store. Examples of customer activity at an online product store include, but are not limited to, clicking within one or more web pages, purchasing products and/or services from the online product store, shuffling between two or more products, and adding and removing products from a shopping cart. Examples of customer activity in the retail store include, but are not limited to, walking into the store, walking into a product section/category, selecting one or more products for purchase, examining one or more products, and purchasing products from the retail store.

Assistance: Assistance refers to support activity that complements the sale of products or services. Assistance can be provided in the form of a message containing relevant product information to a customer. Assistance can also be provided via a phone call from a marketing representative. Information about products can include availability information, discounts, incentives for making a purchase, festival offers, easy payment options, payment installment options, explanation of product features, etc.

Marketing representative: A marketing representative is a person trained to process requests and queries from customers and respond to them by assisting the customers. The marketing representative handles requests or queries associated with various product categories.

Rule: A rule corresponds to one or more conditions or events which, when satisfied, trigger a pre-defined action. It can also correspond to one or more values which, when exceeded, result in another pre-defined action. According to one embodiment of the present invention, the definition of a rule is based on a combination of one or more parameters associated with the customer. Further, according to the embodiment, two or more rules form a tiered set of rules in which the rules are applied progressively in a pre-defined order. For example, rules are implemented as a primary set of rules, followed by a secondary set of rules and followed by a tertiary set of rules. Moreover, when a given rule is not satisfied, no corresponding action is performed.

Examples of such rules include, but are not limited to, triggering a first action when the frequency of a customer's visit to the product store is more than a certain value, and triggering a second action when value of products and/or services purchased by the customer is more than a pre-defined value. Examples of rules may further include triggering a third action when the number of times the customer navigates back and forth between two or more web pages exceeds a certain value, and triggering a fourth action when the number of marketing assistance requests received by the marketing support center is less than a pre-defined value. Examples of rules can also include triggering a fifth action when the customer's bank balance exceeds a pre-determined value, or when the cost of purchases made by the customer's friends exceeds a given value. A rules engine processing the rules can include facts, priority (score), preconditions, rules, and other functions. The rules engine is a component providing, among other functions, the ability to register, define, classify, and manage all the rules. The rules engine also verifies consistency of rule definitions (e.g. Gold-level customers are eligible for free shipping when order quantity >10 and maximum order quantity for Silver-level customers=15), which define the relationships between different rules, and relate some of these rules to software applications that are affected or need to enforce one or more of the rules.

Customer parameters: Customer parameters correspond to one or more attributes of the customer based on characterization of the customer. The customer parameters include, but are not limited to, profile, current geographic location, demographic profile, purchasing history, browsing history, frequency of visiting a web page, current activity on the web page, items in the shopping cart and respective values, credit history, credit card details, products and/or services purchased by the customer's friends and their respective values, and the like.

Parameter value: Parameter value of the parameter corresponds to one of a quantity, a condition, or a determination related to the one or more customer parameters obtained in real-time. Examples of the parameter values include, but are not limited to, a discrete number, a continuously varying number, a true or false flag, and a yes or no flag.

Threshold: Threshold corresponds to that value of the one or more customer parameters which when met satisfies a given rule. Further, a two or more thresholds can form a tiered set of thresholds in which the thresholds are applied in a definitive and progressive order. In the following description, a threshold is also referred to as "a characterizing threshold".

Weighted threshold: Weighted threshold is a threshold defined for a combination of two or more customer parameters.

Web page component: Web page components may include one of a pop-up and a banner published on a web page. Other components known in the art that can be published on the web page may also be included as a web page component for purposes of the ongoing description.

Target web page: Target web page corresponds to a web page selected from the one or more web pages browsed by the customer for publishing the web page component.

Pre-defined action: Pre-defined action corresponds to the action triggered when a rule is satisfied. For example, pre-defined action can be publishing the web page component on a web page or raising a flag for personalized assistance by a marketing representative.

External Parameters: External parameters refer to a set of parameters other than the customer parameters that are considered while providing personalized assistance to the customer. Examples of external parameters may include, but are not limited to, availability of a marketing representative corresponding to a product category, number of marketing assistance requests, category of a product and/or a service for which assistance is sought, time of operation for the marketing representatives, time of operation of the retail store, location of the originating marketing assistance request, and location of the marketing representative.

Real-time: Real-time corresponds to an instance of time when the customer is at the product store.

FIG. 1 is a flow diagram representing a computer implemented marketing method 100 in accordance with an embodiment. In one embodiment method 100 comprises a first step 102, wherein the method 100 characterizes a customer while the customer is shopping and, at a second step 104, provides customized assistance to the customer based upon the customer characterization.

More specifically, at step 102, a customer currently shopping in the product store is characterized based on a determination of whether one or more rules have been satisfied, i.e., customer characterization is performed substantially contemporaneously with the customer's shopping experience. When the customer visits the product store, the parameter values of customer parameters are determined. In one embodiment, the activities of the customer in the product store are contemporaneously monitored (i.e., in real-time) to generate behavior-based parameter values of the customer parameters. In another embodiment, the parameter values are determined by accessing various databases that store information associated with the customer. Examples of such databases may include, but are not limited to, a database of the customer's prior purchasing history, a database of the customer's financial or credit information, a database associated with social networking websites, and a database associated with web servers hosting the online product store. In one embodiment, a threshold is defined for the parameter value of each of the one or more customer parameters. In another embodiment, a weighted threshold is defined for a combination of two or more customer parameters.

In another embodiment, a rule is satisfied if the parameter value of each of the one or more customer parameters meets or satisfies the respective threshold. In another embodiment, a rule is satisfied if the parameter value of at least one of the customer parameters defining the rule meets the respective threshold. In another embodiment, a rule is satisfied if the parameter value of a combination of the two or more customer parameters meets a weighted threshold. In an embodiment, the threshold is met when the quantitative value of the one or more customer parameters exceeds the corresponding thresholds. In another embodiment, the threshold is met when the quantitative value of the one or more customer parameters is below the corresponding thresholds. In another embodiment, a tiered rule set may be applied if one or more parameter values meet or exceed one or more corresponding thresholds, or if a single threshold is exceeded by a pre-determined amount.

In yet another embodiment, one or more rules are combined to form a super rule. A super rule is satisfied when the one or more rules forming the super rule are satisfied simultaneously. In one embodiment, the super rule is satisfied when one or more parameters corresponding to the one or more rules forming the super rule meet or exceed a tiered threshold.

The customer is grouped into different categories based on the satisfied rules and/or super rules. Examples of categories in which the customer can be characterized may include, but are not limited to, a potential buyer, a customer with high purchasing capabilities, a customer having bulk purchase requirements, a customer with a good purchase history, a first-time customer with no purchase or history thereof, a mediocre customer with an average-looking purchase history, and a dissatisfied customer based on customer purchase history and records. One of ordinary skill in the art would appreciate that any number of categories can be defined without departing from the scope of the present description. Each category can pertain to the one or more associated rules. Such rules, when satisfied, would lead to categorization of the corresponding customer into one or more associated categories. In an embodiment, the one or more rules may be associated with a single category. In an embodiment, each rule may be associated with multiple categories.

At step 104, real-time customized assistance is provided to the customer if the characterization threshold is met. In one embodiment, the type, nature, or extent of assistance provided to the customer is customized in real-time based on the specific one or more rules satisfied by the customer activities, or customer parameters. In another embodiment, a pre-determined assistance is provided to the customer in real-time based on the one or more rules satisfied by the customer. In another embodiment, multiple tiers of customized assistance may be implemented if a threshold for a rule is exceeded by a pre-determined amount. In yet another embodiment, a customized assistance corresponding to the super rule satisfied by the customer is provided. When the customer satisfies a super rule, a customized assistance corresponding to the super rule is only provided to the customer. When the super rule is not satisfied, but some of the one or more rules forming the super rule are satisfied, the individual customized assistances corresponding to the rules satisfied are provided to the customer.

In an embodiment, real-time customized assistance is provided to a customer by publishing the web page component on the web page browsed by the customer. The web page component is customizable in real-time based on the characterization of the customer. In another embodiment, real-time customized assistance is provided to a customer by assigning a marketing representative in a retail store to the customer.

Figure 2:
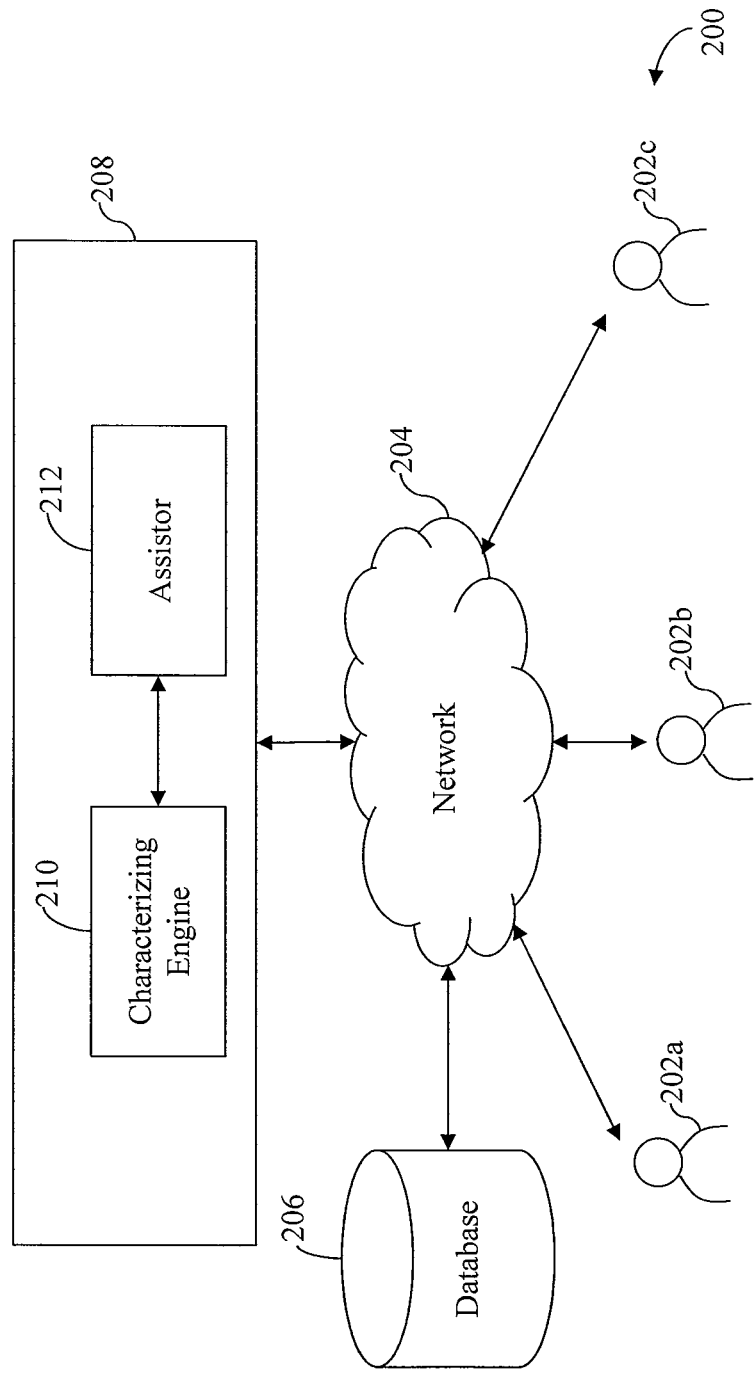
FIG. 2 illustrates a block diagram of an environment in which the present disclosure can be implemented in accordance with an embodiment.

FIG. 2 illustrates a block diagram of an exemplary environment 200 in which the present disclosure may be implemented in accordance with an embodiment. The environment 200 includes a first customer 202a, a second customer 202b, a third customer 202c, a network 204, a database 206, and a marketing system 208. The marketing system 208 includes a characterizing engine 210 and an assistor 212.

In this embodiment, the first customer 202a, the second customer 202b, and the third customer 202c, hereafter generally referred to as customer 202, correspond to a customer visiting a retail store. For example, the characterizing engine 210 monitors customer behavior is to observe that a customer browses through particular aisles or for particular products. In another embodiment, the customer 202 may correspond to a customer browsing through one or more web pages of an online shopping website. The customer 202 may use a user device (not shown) to browse the one or more web pages of the online shopping website. Examples of the user device may include, but are not limited to, laptops, televisions (TVs), tablet computers, desktops, mobile phones, handheld devices, Personal Digital Assistant (PDA) devices, or any other device with hardware and software components to enable browsing of the one or more web pages. Although FIG. 2 shows only three customers for simplicity, it may be appreciated that the disclosed embodiments can be implemented for a larger number of customers.

The network 204 corresponds to a medium through which various components of the exemplary environment 200 communicate with each other. Examples of the network 204 may include, but are not limited to, the Internet, a Wireless Fidelity (WiFi) network, a Wireless Area Network (WAN), a Local Area Network (LAN), a telephone line (POTS), or a Metropolitan Area Network (MAN). Various devices in the exemplary environment 200 can connect to the network 204 in accordance with various wired and wireless communication protocols such as Transmission Control Protocol and Internet Protocol (TCP/IP), Customer Datagram Protocol (UDP), Hypertext Transfer Protocol (HTTP), or File Transfer Protocol (FTP).

The database 206 corresponds to a storage device, or alternatively multiple storage devices distributively connected, that store data associated with the customer 202 and the marketing system 208. In an embodiment, the database 206 communicates with the marketing system 208 through the network 204. In another embodiment, the database 206 may be integrated with the marketing system 208. The database 206 can be implemented by using several technologies that are well known to those skilled in the art. Some examples of such technologies may include, but are not limited to, MySQL® and Microsoft SQL®.

The marketing system 208 comprises a computing device or a server-computing device. The marketing system 208 may be implemented as a cluster or network of computing devices configured to jointly perform the functions of the marketing system 208. The marketing system 208 includes one or more applications that enable the marketing system 208 to provide real-time customized assistance to the customer 202.

In an embodiment, the marketing system 208 corresponds to a web server hosting the one or more web pages of an online shopping website. Examples of the web server include, but are not limited to, Apache HTTP Server®, Microsoft Internet Information Services (IIS)®, and Sun Java System Web Server®. The one or more web pages may include one or more hyperlinks that enable navigation to other related product store web pages. The one or more web pages provide information about various products and services offered by the one or more companies, manufacturers, or service providers on the associated online shopping website. This information may be presented as, but is not limited to, one or more images, text, digital media, interactive elements, or animation.

In another embodiment, the marketing system 208 can also be associated with the one or more retail store devices. For example, the marketing system 208 may include a web server and a retail server. The web server can host the one or more web pages and the retail server manages the retail store devices. The retail store devices can be computing devices that enable marketing representatives at the retail store to provide the real-time customized assistance to customers in the retail store consequent to a real-time characterization and rule analysis of the customers. The marketing system 208 may optionally include storage media for storing data associated with the customer 202, the marketing representatives, etc.

The characterizing engine 210 is configured to characterize the customer 202 in real-time based on the one or more rules satisfied by the customer 202. The assistor 212 is configured to provide real-time customized assistance to the customer 202 based on the one or more rules satisfied by the customer 202.

Figure 3:
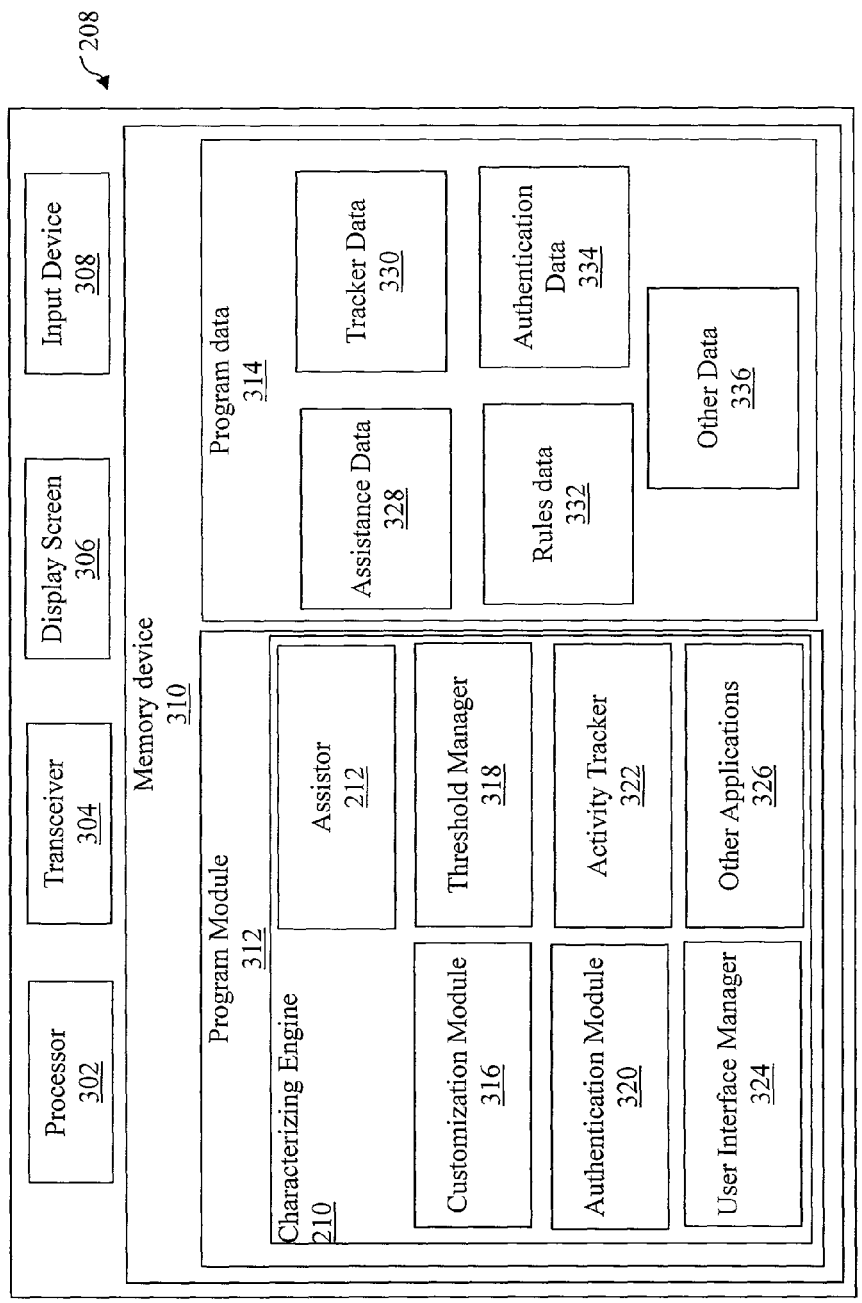
FIG. 3 illustrates a block diagram of a marketing system in accordance with an embodiment.

FIG. 3 illustrates a block diagram of the marketing system 208 in accordance with an embodiment. The FIG. 3 is described in conjunction with the block diagram of FIG. 2. The marketing system 208 includes a processor 302, a transceiver 304, a display screen 306, an input device 308, and a memory device 310. Further, the memory device 310 includes program module 312 and program data 314.

The processor 302 is coupled to the transceiver 304, the display screen 306, the input device 308, and the memory device 310. The processor 302 is configured to execute a set of instructions stored in the memory device 310.

The transceiver 304 is configured to transmit and receive data and messages. The transceiver 304 transmits and receives data in accordance with various known communication protocols.

The display screen 306 can be realized through several known technologies and can be a touch screen that is further configured to receive an input from an administrator.

Examples of the input device 308 may be, but are not limited to, a keyboard, a mouse, a joystick, a gamepad, a stylus, or a touch screen. In an embodiment, the input device 308 corresponds to an identification card reader such as a scanner and a magnetic card reader.

The memory device 310 is configured to store a set of instructions or modules and data. Some of the commonly known memory device implementations can be, but are not limited to, Random Access Memory (RAM), Read Only Memory (ROM), Hard Disk Drive (HDD), and a Secure Digital (SD) card. The program module 312 includes a set of instructions that can be executed by the processor 302 to perform specific functions in the marketing system 208. Although the processor 302 may be a portion of a general purpose computing device, when executing the instructions, the general purpose computing device becomes a specific purpose computing device performing the function(s) defined by the instructions. Further, the program module 312 includes the characterizing engine 210 which is comprised of the assistor 212, a customization module 316, a threshold manager 318, an authentication module 320, an activity tracker 322, a user interface manager 324, and other applications 326.

The program data 314 in the memory device 310 includes assistance data 328, tracker data 330, rules data 332, authentication data 334, and other data 336.

The characterizing engine 210 may be configured to characterize the customer 202 in real-time based on the one or more rules satisfied by the customer 202.

In an embodiment, the characterizing engine 210 is further configured to select the one or more customer parameters that would define the one or more rules for the customer 202 based on the one or more of a log of customer activities and external parameters.

The characterizing engine 210 defines a rule based on the one or more customer parameters. In an embodiment, the characterizing engine 210 defines each rule based on the combination of two or more customer parameters. In another embodiment, the characterizing engine 210 defines each rule based on the one or more external parameters. In another embodiment, the characterizing engine 210 defines the rules based on a combination of the customer parameters and the external parameters. The characterizing engine 210 stores the one or more rules as the rules data 332. In an embodiment, the characterizing engine 210 is configured to define rules based on an input provided by an administrator operating the marketing system 208. In an embodiment, the characterizing engine 210 is configured to define super rules based on a combination of the one or more rules.

The characterizing engine 210 is further configured to determine the values of the one or more customer parameters and the external parameters. In an embodiment, the characterizing engine 210 generates the values of the one or more customer parameters based on the customer activities tracked in real-time by the activity tracker 322. In another embodiment, the characterizing engine 210 retrieves the values of the one or more customer parameters and the external parameters from the database 206. The characterizing engine 210 is further configured to determine whether the customer 202 satisfies the one or more rules and/or super rules. In another embodiment, the characterizing engine 210 implements a tiered rule set based on the one or more rules being satisfied.

The assistor 212 is configured to provide real-time customized assistance to the customer 202 based on the one or more rules satisfied by the customer 202. In an embodiment, the assistor 212 contemporaneously publishes the web page component on the web page browsed by the customer 202 when a first parameter value meets the corresponding threshold. In another embodiment, the assistor 212 contemporaneously assigns a marketing representative in the retail store to the customer 202 when a second parameter value meets the corresponding threshold.

The customization module 316 is configured to customize the assistance provided to the customer 202 in real-time. In an embodiment, the customization module 316 customizes the assistance based on the one or more rules satisfied by the customer 202.

In an embodiment, while the customer 202 browses the one or more web pages, the customization module 316 customizes the content of the web page component on the one or more web pages in real-time, based at least in part, on the one or more rules satisfied by the customer 202. The content of the web page component may also include at least an audio message, a video message, a text message, or an animation. In an embodiment, the content of the web page component may include a phone number and a message inviting the customer 202 to call that phone number. The phone number is customized by the customization module 316 based on the one or more rules satisfied by the customer 202. In another embodiment, the content of the web page component may include a message requesting the phone number of the customer 202. The customization module 316 is further configured to determine a target web page from the one or more web pages to publish a web page component in real-time. The customization module 316 is further configured to determine, in real-time, a type of the web page component, based at least in part, on the one or more rules satisfied by the customer activities. The customization module 316 stores the customized assistance data as the assistance data 328.

In another embodiment, when the customer 202 visits a retail store, the assistor 212 is configured to assign a marketing representative to the customer 202 based on the one or more rules satisfied by the customer 202. According to one embodiment, a video monitoring system is coupled to the characterization engine 210. The assistor 212 responds, in real-time, to the user's actions and behavior captured in the store.

The threshold manager 318 is configured to define a threshold. In an embodiment, the threshold manager 318 defines the threshold based on one or more of the external parameters and a log of customer activities. In an embodiment, the threshold manager 318 is configured to define the threshold based on an input provided by an administrator. In another embodiment, the threshold manager 318 receives a log of user activities from the activity tracker 322 and automatically defines and/or updates the threshold. The threshold can be updated either periodically, when requested by the administrator, or on the occurrence of discrete events such as an upcoming festival, etc. In another embodiment, the administrator can manually update the threshold. In an embodiment, the threshold manager 318 defines a tiered threshold corresponding to the super rule. In another embodiment, the threshold manager 318 defines the weighted threshold.

The authentication module 320 is configured to authenticate the customer 202. In an embodiment, the customer 202 registers with the marketing system 208 during a one-time sign up process. The customer 202 may then access the marketing system 208 by providing a login name and password obtained after a successful registration. The authentication module 320 stores the login name and the password as the authentication data 334. In an embodiment, when the customer 202 browses through the one or more web pages, the authentication module 320 verifies the login details of the customer 202 visiting the one or more web pages hosted by the marketing system 208. The authentication module 320 can also verify the customer 202 through other means such as, but not limited to, Media Access Control (MAC) address, IP address, biometric identification including facial recognition, RFID cards, credit card details, customer's name, address or through any other identifiers unique to the customer 202, and combinations of the foregoing. In another embodiment, the authentication module 320 verifies the customer 202 through an identification card provided to the customer 202 during the registration process. The authentication module 320 maintains a customer profile corresponding to each customer 202. The customer profile may include information such as, but not limited to, the customer's name, occupation, age, gender, education, and geographic location. Such customer profiles can be stored either locally on the marketing system 208 or in the database 206.

The activity tracker 322 is configured to track the one or more activities of the customer 202 and store a log of the customer activities as the tracker data 330. In an embodiment, the activity tracker 322 tracks customer activities on the one or more web pages browsed by the customer 202. In another embodiment, the authentication module 320 authenticates the customer 202 in the product store and provides the authentication information to the activity tracker 322. The activity tracker 322 can be implemented by using several technologies that are well known in the art. Some examples of technologies include, but are not limited to, tracking cookies associated with the web browser and analysis of web logs.

In another embodiment, the activity tracker 322 tracks the activities of the customer 202 visiting a retail store. The activity tracker 322 may communicate via the transceiver with a retail store device installed at the retail store. The retail store device can be configured to track customer activities in the retail store and communicate such activities to the activity tracker 322 in real-time through the use of a video capture system for tracking customer path, behavioral analysis tools and the like.

The user interface manager 324 is configured to generate and display a graphical user interface on the display screen 306 of the marketing system 208. In an embodiment, the user interface manager 324 is configured to present one or more input options to the administrator. In another embodiment, the user interface manager 324 is configured to present one or more input options to the marketing representatives. The user interface manager 324 further displays the information associated with the customer 202 and the marketing representatives to the administrator.

The other applications 326 include one or more software applications that can run on the marketing system 208 to perform specific functions. Examples of the one or more applications may include, but are not limited to, report generating applications, communication applications, an operating system, quantitative and qualitative analysis tools, user analytics applications, and sales analytics tools.

The other data 336 may include data corresponding to one or more web pages, data associated with the history of interaction between the customer 202 and the marketing representatives, profiles, and other associated information about the marketing representatives, etc.

It may be appreciated that the disclosed embodiments can be extended to include one or more blocks in the program module that can enable the marketing system 208 to perform additional functions. A person skilled in the art would appreciate that the one or more blocks in FIG. 3 can be combined together to form a single module that is capable of performing various functions of the marketing system 208.

Figure 4:
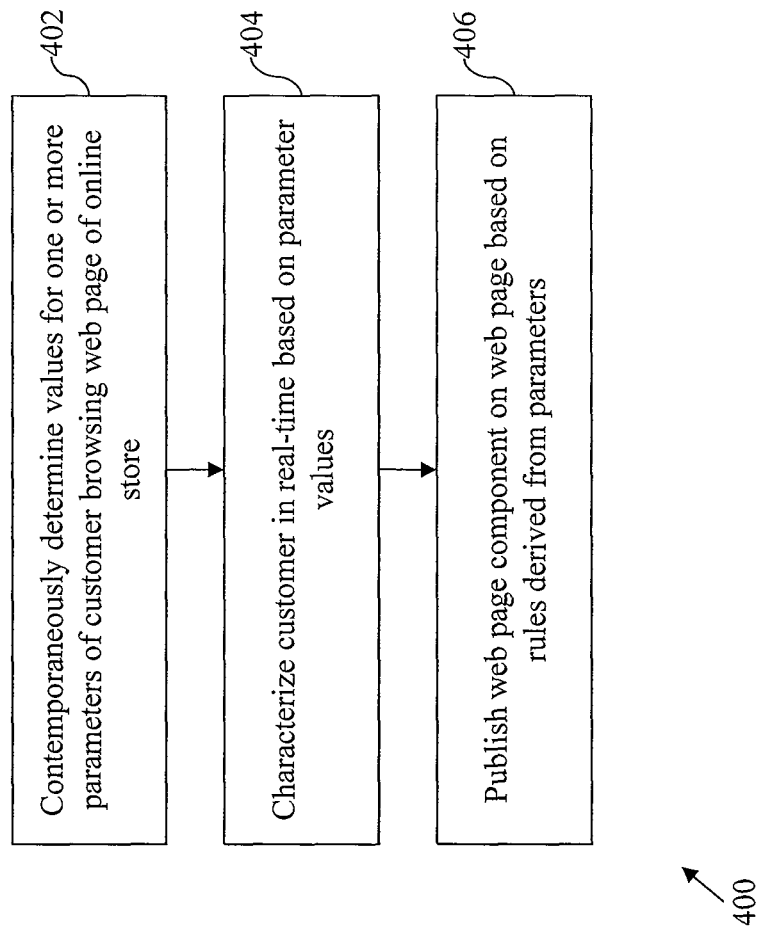
FIG. 4 is a flow diagram representing a computer implemented marketing method in accordance with an embodiment.

FIG. 4 illustrates a flowchart representing a computer implemented marketing method 400 in accordance with an embodiment. The method 400 is described in conjunction with the block diagram of FIG. 2 and FIG. 3.

At step 402, the method 400 contemporaneously determines values for the one or more parameters of the customer 202 browsing the web pages of an online product store.

When the customer 202 browses the one or more web pages of an online shopping website, the authentication module 320 authenticates the customer 202 and allows access to the marketing system 208 based on the successful authentication. The characterizing engine 210 selects the one or more customer parameters that would define the one or more rules for the customer 202. Such selection can be based on the log of customer activities and/or the external parameters. The characterizing engine 210 defines one or more rules based on the selected one or more customer parameters. The activity tracker 322 contemporaneously tracks the customer activities on the one or more web pages. Based on the tracked customer activities, the characterizing engine 210 generates the values of the one or more customer parameters.

For example, the customer 202 can be a customer visiting an online shopping website that markets various categories of electronic products such as cameras, televisions, mobile phones, laptops, etc. The customer 202 may be visiting the website for the first time. The authentication module 320 registers the customer 202 through a sign-up process and allows the customer 202 to login to the marketing system 208 when registered successfully. The activity tracker 322 determines that the customer 202 has successfully logged in to the online shopping website. A first customer parameter associated with the customer 202 can be the customer's bank balance and a second customer parameter associated with the customer 202 can be the cost of products in his shopping cart. The threshold manager 318 defines a first threshold, such as a certain amount, for the first customer parameter and a second threshold, such as a pre-defined value, for the second customer parameter. The characterization engine 210 defines a first rule based on the combination of the first customer parameter and the second customer parameter. For example, the characterization engine 210 defines a first rule to provide a discount to the customer 202 if the customer's bank balance is more than a certain amount and the cost of products in his shopping cart exceeds a pre-defined value.

At step 404, the customer 202 is characterized in real-time based on the parameter values determined by the characterizing engine 210.

The characterizing engine 210 determines in real-time whether the customer 202 satisfies the one or more rules based on the real-time values of the one or more customer parameters. The characterizing engine 210 determines whether the customer activities satisfy any rule. Further, based on the satisfied rules, the characterizing engine 210 characterizes the customer 202, for example, as a buyer eligible for receiving customized assistance.

In the above example, the characterizing engine 210 determines, in real-time, the bank balance of the customer 202. Concurrently, the characterizing engine 210 further determines if the bank balance of the customer 202 exceeds a pre-defined amount. Further, the activity tracker 322 tracks the customer 202 in real-time to determine the products added and/or removed from the shopping cart of the customer 202. The characterizing engine further determines the cost of the products in the shopping cart of the customer 202.

The characterizing engine 210 determines whether the customer 202 satisfies the first rule and characterizes the customer 202 as a high-value customer when the bank balance of the customer 202 exceeds a certain amount and the cost of the products in the shopping cart of the customer 202 exceeds the pre-defined value. Further, the characterizing engine 210 determines the target web for publishing a web page component.

At step 406, the web page component is published on the target web page based on the rules derived from the customer parameters.

When the characterization engine 210 characterizes the customer 202 as eligible for receiving the customized assistance, the assistor 212 publishes the web page component on the target web page. The customization module 316 contemporaneously customizes the content of the web page component in real-time based on the one or more customer parameters that meet the corresponding threshold.

With reference to the foregoing example, the assistor 212 may contemporaneously provide first assistance by publishing a pop-up containing a customized message for example, "Do you want to purchase the TV? We can give you a 5% discount and convert the entire payment in monthly installments. To learn more, please dial 1234, or click on the hyperlink displayed below".

In another example, the customer 202 corresponds to a customer frequently visiting the online shopping website for purchasing products. The activity tracker 322 determines that the customer 202 has successfully logged in to the online shopping website. A third customer parameter associated with the customer 202 can be the cost of products purchased by the customer 202 in the last five visits. The threshold manager 318 defines a third threshold, such as a pre-defined amount, for the third customer parameter. The characterizing engine 210 defines a second rule based on the third customer parameter. For example, the characterizing engine 210 defines the second rule to provide service support to the customer 202 if the cost of products purchased in the last five visits exceeds the pre-defined amount. The characterizing engine 210 retrieves the cost of the products purchased earlier from the database (step 402) and determines if the cost exceeds the pre-defined amount (step 404). If the cost exceeds the pre-defined amount, the assistor 212 provides a second assistance, such as a pop-up including a message on the web page currently viewed by the customer 202 (step 406). In an embodiment, the pop-up includes a real-time customized message "Welcome Back! Would you like to know about the accessories associated with the camera you had purchased earlier? Please call 1234".

A fourth customer parameter associated with the customer 202 can be number of times the customer 202 navigates from one web page to another and a fifth customer parameter associated with the customer 202 can be the products purchased by a friend of the customer 202. The threshold manager 318 defines a fourth threshold, such as a pre-defined number, for the fourth customer parameter. The threshold manager 318 further defines a fifth threshold, such as a category of product purchased by the friend of the customer 202 is a television, for the fifth customer parameter. The characterizing engine 210 defines a third rule based on the combination of the fourth customer parameter and the fifth customer parameter. For example, the characterizing engine 210 defines a third rule to provide information about television if the number of times the customer 202 navigates between web pages showing television is more than the pre-defined number and the customer's friend has purchased a television. The activity tracker 322 determines that the customer 202 is viewing a first web page displaying a product category corresponding to television. The characterizing engine 210 determines whether the friend of the customer 202 has earlier purchased a television from the shopping website. Concurrently, the activity tracker 322 determines that the customer 202 has been navigating between two web pages displaying the model A and model B of a television respectively. The characterizing engine 210 determines the number of times the customer 202 navigates from the web page displaying model A to another web page displaying model B (step 402). If this number exceeds the pre-defined number and the friend of the customer 202 has purchased a television (step 404), the assistor 212 provides a third assistance, such as a pop-up including a message "To learn more about model A and model B, please dial 1234 or click on the hyperlink displayed below" (step 406).

In another example, the customer 202 visits a retail store selling various categories of electronic products such as cameras, televisions, mobile phones, laptops, etc. The customer 202 may be identified in the retail store by a face recognition technique using one or more cameras installed in the retail store. A customer parameter associated with the customer 202 can be the frequency of a customer's visit to the retail store. A threshold, such as a pre-determined count for the customer parameter, can be defined. A rule is defined based on the customer parameter. For example, the rule is defined to provide a discount to the customer 202 if the customer's frequency of visit is more than the pre-determined count. When the customer 202 is characterized as a frequent customer, a flag is raised to assign a marketing representative to the customer 202. The marketing representative would have information about the profile of the customer and previous products/services purchased by the customer 202. The marketing representative can offer service support for the products/services purchased earlier or offer discounts on the new products purchased by the customer 202.

The one or more customer parameters are determined by accessing various databases that store information associated with the customer 202.

Figure 5:
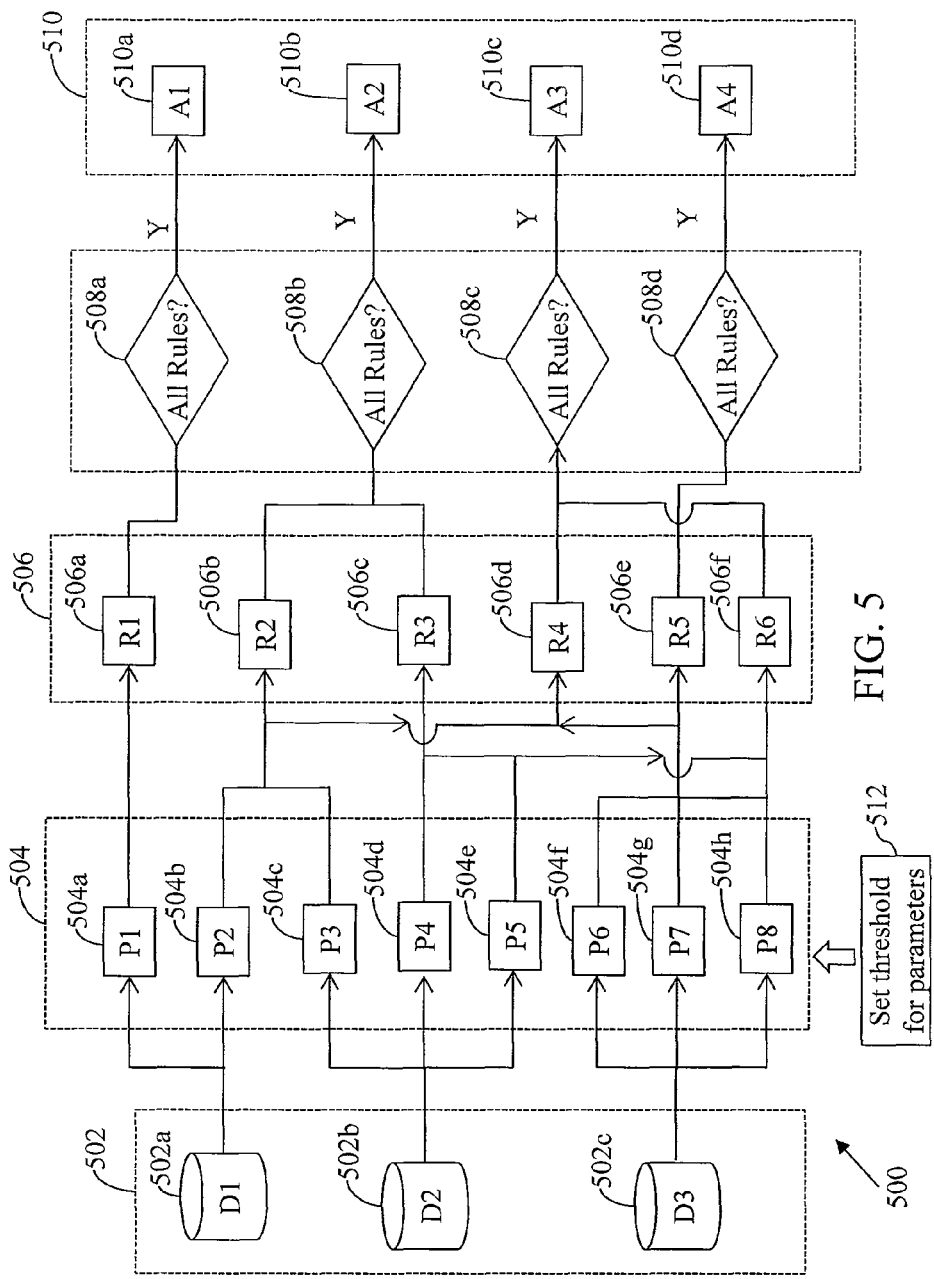
FIG. 5 illustrates an exemplary implementation of the relationship between customer parameters, rules, and customized assistance in accordance with an embodiment.

FIG. 5 illustrates an exemplary implementation 500 depicting the relationships between customer parameters, rules, and customized assistance corresponding to the customer 202 in accordance with an embodiment. The exemplary implementation 500 is described in conjunction with FIG. 1, FIG. 2, FIG. 3, and FIG. 4.

In an embodiment, the marketing system 208 includes a set of databases 502, a set of customer parameters 504, a set of rules 506, a set of decision points (e.g. 508a, 508b, 508c, and 508d) built in the characterizing engine 210, and a set of customized assistances 510. The set of databases 502 includes one or more databases 502a, 502b, and 502c. The set of customer parameters 504 includes one or more parameters 504a, 504b, 504c, 504d, 504e, 504f, 504g, and 504h. The set of rules includes one or more rules 506a, 506b, 506c, 506d, 506e, and 506f. The set of customized assistances includes one or more customized assistances 510a, 510b, 510c, and 510d.

The database D1 502a may correspond to the database of a product store that stores customer parameters related to customer activities in the product store. Based on the data stored in the database D1 502a, the parameter P1 504a and the parameter P2 504b are determined for the customer 202. The parameter P1 504a may correspond to the purchasing history of the customer 202 and the parameter P2 504b may correspond to the cost of items in the shopping cart.

Further, database D2 502b may correspond to a database of the customer's financial information such as bank account balances, or credit history. Based on the data stored in the database D2 502b, the parameter P3 504c, the parameter P4 504d, and the parameter P5 504e are determined for the customer 202. The parameter P3 504c may correspond to the credit history of the customer 202. The parameter P4 504d may correspond to the average bank balance of the customer 202 in the last six months and the parameter P5 504e may correspond to the credit card details of the customer 202.

Further, database D3 502c may correspond to the database associated with social networking web sites. The database D3 502c may store information such as details about the customer's friends, the customer's profile, etc. Based on the data stored in the database D3 502c, the parameter P6 504f, the parameter P7 504g, and the parameter P8 504h are determined for the customer 202. The parameter P6 504f may correspond to the occupation of the customer 202. The parameter P7 504g may correspond to the Facebook® profile of the customer 202 and the parameter P8 504h may correspond to products and/or services purchased by friends of the customer 202.

A threshold is defined for each of the parameters P1 504a, P2 504b, P3 504c, P4 504d, P5 504e, P6 504f, P7 504g, and P8 504h at 512.

The one or more rules R1 506a, R2 506b, R3 506c, R4 506d, R5 506e, and R6 506f are determined based on the parameters P1 504a, P2 504b, P3 504c, P4 504d, P5 504e, P6 504f, P7 504g, and P8 504h. For example, the rule R1 506a is determined based on the parameter P1 504a. The rule R1 506a can be defined as "if cost of products previously purchased by the customer 202 is more than a certain amount, then provide a discount of 5% on next purchase". The rule R2 506b is determined based on a combination of the parameter P2 504b and the parameter P3 504c. Similarly, the rule R3 506c is determined based on a combination of the parameter P4 504d and the parameter P5 504e. Further, the rule R4 506d is determined based on a combination of the parameter P2 504b, parameter P3 504c, parameter P6 504f, parameter P7 504g, and the parameter P8 504h. Further, the rule R5 506e is determined based on a combination of the parameter P6 504f, parameter P7 504g, and the parameter P8 504h.

Moreover, the one or more rules (e.g. R1 506a, R2 506b, R3 506c, R4 506d, R5 506e, and R6 506f) may be combined to form a super rule. For example, the rule R2 506b and the rule R3 506c are combined to form a first super rule. Similarly, the rule R4 506d and the rule R6 506f are combined to form a second super rule.

The customer 202 is characterized based on whether the rules R1 506a, R2 506b, R3 506c, R4 506d, R5 506e and R6 506f, and/or super rules are satisfied. At 508a, the characterizing engine 210 determines whether the rule R1 506a is satisfied or not. When the rule R1 506a is satisfied, the customized assistance A1 510a is provided to the customer 202.

Further, at 508d the characterizing engine 210 determines whether the rule R5 506e is satisfied. When the rule R5 506e is satisfied, the customized assistance A4 510d is provided to the customer 202.

Similarly, at 508b, the characterizing engine 210 determines whether the first super rule formed by the combination of the rule R2 506b and the rule R3 506c is satisfied. When the first super rule is satisfied, the customized assistance A2 510b corresponding to the first super rule is provided to the customer 202. Further, when the first super rule is satisfied, individual assistance (not shown in FIG. 5) corresponding to either the rule R2 506b or the rule R3 506c are not provided to the customer 202. Moreover, when the first super rule is not satisfied but either the rule R2 506b or the rule R3 506c is satisfied, the individual assistance corresponding to the satisfied rule R2 506b or rule R3 506c is provided to the customer 202.

Further, at 508c, the characterizing engine 210 determines whether the second super rule formed by the combination of the rule R4 506d and the rule R6 506f is satisfied. When the second super rule is satisfied, the customized assistance A3 510c corresponding to the second super rule is provided to the customer 202. Further, when the second super rule is satisfied, individual assistances (not shown in FIG. 5) corresponding to either the rule R4 506d or the rule R6 506f are not provided to the customer 202. Moreover, when the second super rule is not satisfied but either the rule R4 506d or the rule R6 506f is satisfied, an individual assistance corresponding to the satisfied rule R4 506d or the rule R6 506f is provided to the customer 202.

The disclosed methods and systems, as described in the ongoing description or any of its components, may be embodied in the form of a computer system. Typical examples of a computer system include, but are not limited to, a general-purpose computer, a programmed microprocessor, a micro-controller, a peripheral integrated circuit element, and other devices or arrangements of devices that are capable of implementing the steps that constitute the method of the present disclosure. One of ordinary skill in the art would recognize that embodiments of the invention, although described as being implemented as executable software, may be implemented in hardware, or a combination of hardware and software.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a customer through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks such as the steps that constitute the method of the present disclosure. The method and systems described can also be implemented using only software programming or using only hardware or by a varying combination of the two techniques. The disclosure is independent of the programming language used and the operating system in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the present disclosure. The software may also include modular programming in the form of object-oriented programming. The processing of input data by the processing machine may be in response to customer commands, results of previous processing or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The programmable instructions can also be transmitted by data signals across a carrier wave. The disclosure can also be embodied in a computer program product comprising a computer-readable medium, with the product capable of implementing the above methods and systems, or the numerous possible variations thereof.

While various embodiments have been illustrated and described, it will be clear that the disclosure is not limited to these embodiments only. Numerous modifications, changes, variations, substitutions, and equivalents will be apparent to those skilled in the art without departing from the spirit and scope of the invention as described in the claims.

The invention claimed is:

1. A computer implemented marketing method comprising:
   characterizing a customer in one or more categories, by a computer, in real-time, based on a determination of whether one or more rules have been satisfied; and
   providing real-time customized assistance to the customer if a characterizing threshold is met, where the one or more rules are combined to form a super rule.

2. The computer implemented marketing method of claim 1, where each of the one or more rules is defined based on one or more parameters associated with the customer.

3. The computer implemented marketing method of claim 2, where each of the one or more rules is satisfied if the corresponding one or more parameters meet or exceed a threshold.

4. The computer implemented marketing method of claim 2, where the one or more parameters comprise at least one of customer's financial information, customer's current geographical location, customer's purchase history, customer's cart value, items in a cart, or customer's credit card details.

5. The computer implemented marketing method of claim 1, further comprising providing real-time customized assistance corresponding to the super rule when the super rule is satisfied.

6. The computer implemented marketing method of claim 1, further comprising providing real-time customized assistance corresponding to the one or more rules forming the super rule when the super rule is not satisfied.

7. The computer implemented marketing method of claim 1, where the super rule comprises a tiered set of rules, where a plurality of rules forming the tiered set of rules are applied in a pre-defined order.

8. The computer implemented marketing method of claim 7, where the tiered set of rules is satisfied when one or more parameters corresponding to the plurality of rules forming the tiered set of rules meet or exceed a tiered set of thresholds.

9. The computer implemented marketing method of claim 1, where providing the real-time customized assistance comprises publishing a web page component on a web page, the web page component being customizable in real-time based on the characterizing.

10. The computer implemented marketing method of claim 1, where providing the real-time customized assistance comprises assigning a marketing representative to the customer in a retail store based on monitoring and tracking actions of the customer.

11. A computer implemented marketing system comprising:
    a processor configured to:
    characterize a customer, in real-time, in one or more categories based on one or more rules being satisfied, where each rule of the one or more rules is satisfied when one or more parameters defining each of the one or more rules meet respective thresholds; and
    provide a real-time customized assistance to the customer based on the one or more rules being satisfied.

12. The computer implemented marketing system of claim 11, where the processor is configured to customize the assistance in real-time based on the one or more rules being satisfied.

13. The computer implemented marketing system of claim 11, where the processor is configured to define the threshold based on at least one of the number of contemporaneous customers, the one or more parameters, and availability of a marketing representative.

14. The computer implemented marketing system of claim 11, where the processor is configured to collect data associated with a customer activity to determine the one or more rules being satisfied.

15. The computer implemented marketing system of claim 14, where the customer activity comprises at least one of viewing one or more products, clicking within a web page, purchasing products and/or services, shuffling between two or more products, or adding and removing products from customer's cart.

16. The computer implemented marketing system of claim 11, where the processor is configured to implement a tiered rule set, where the processor applies a plurality of rules forming the tiered rule set in a pre-defined order.

17. A computer implemented marketing method comprising:
    generating values for one or more parameters associated with a customer browsing a web page of an online store;
    characterizing the customer, by a computer, in real-time, in one or more categories based on a determination of whether one or more rules have been satisfied, where each rule of the one or more rules is satisfied when a value of the one or more parameters defining each of the one or more rules meet respective thresholds; and
    publishing a web page component based on the satisfied one or more rules, where a content of the web page component is customizable in real-time based on the satisfied one or more rules.

18. The computer implemented marketing method of claim 17, further comprising determining a target web page to publish the web page component.

19. The computer implemented marketing method of claim 17, further comprising determining a type of the web page component based on the satisfied one or more rules.

* * * * *